(12) United States Patent
Schiller et al.

(10) Patent No.: US 9,191,709 B2
(45) Date of Patent: Nov. 17, 2015

(54) DIGITAL AD INSERTION FOR VIDEO-ON-DEMAND

(75) Inventors: Jay B. Schiller, Medina, WA (US); Christopher R. Halverson, Portland, OR (US); Andrew J. B. Poole, Louisville, CO (US); Joseph R. Matarese, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 2339 days.

(21) Appl. No.: 10/592,193

(22) PCT Filed: Mar. 9, 2005

(86) PCT No.: PCT/US2005/007777
§ 371 (c)(1), (2), (4) Date: Apr. 26, 2011

(87) PCT Pub. No.: WO2005/086865
PCT Pub. Date: Sep. 22, 2005

(65) Prior Publication Data
US 2012/0030704 A1 Feb. 2, 2012

Related U.S. Application Data

(60) Provisional application No. 60/552,060, filed on Mar. 9, 2004.

(51) Int. Cl.
*H04N 7/10* (2006.01)
*H04N 7/025* (2006.01)
(Continued)

(52) U.S. Cl.
CPC ..... *H04N 21/47202* (2013.01); *H04N 7/17336* (2013.01); *H04N 21/25891* (2013.01);
(Continued)

(58) Field of Classification Search
CPC .............. H04N 21/262; H04N 21/812; H04N 21/8543; H04N 21/8547
USPC ..................................................... 725/32–36
See application file for complete search history.

(56) References Cited

U.S. PATENT DOCUMENTS 5,600,364 A * 2/1997 Hendricks et al. ................ 725/9
2002/0069404 A1 6/2002 Copeman et al.
(Continued)

FOREIGN PATENT DOCUMENTS

EP 0834798 A2 4/1998
JP 2000013682 A 1/2000
(Continued)

OTHER PUBLICATIONS

Search Report, EPO Application No. 05725125.8, mailed Jan. 24, 2007.
(Continued)

*Primary Examiner* — Dominic D Saltarelli
(74) *Attorney, Agent, or Firm* — Troy A. Van Aacken

(57) ABSTRACT

A video-on-demand (VOD) service provider is configured to select advertising to provide with video-on-demand content, the advertising selected at least in part according to at least one of content metadata, ad schedules, or subscriber profile information, and to signal when the advertising is unavailable. The VOD service provider is configured to identify ad break points for the video-on-demand content to generate a playlist identifying the video-on-demand content and when the video-on-demand content is to be provided, and identifying content corresponding to selected advertising and when the content corresponding to the selected advertising is to be provided. The VOD server receives from a set top box a signal to pause or stop providing of the content to the set top box, and receives from the set top box a signal to resume providing the content to the set top box, and selects different advertising at least in part according to changed conditions when the signal to resume is received, and modifies the playlist to reference the different advertising.

11 Claims, 6 Drawing Sheets

(51) Int. Cl.
  *H04N 21/472* (2011.01)
  *H04N 21/8543* (2011.01)
  *H04N 21/262* (2011.01)
  *H04N 7/173* (2011.01)
  *H04N 21/258* (2011.01)
  *H04N 21/2668* (2011.01)
  *H04N 21/81* (2011.01)
  *H04N 21/845* (2011.01)

(52) U.S. Cl.
  CPC ......... *H04N21/262* (2013.01); *H04N 21/2668* (2013.01); *H04N 21/26258* (2013.01); *H04N 21/812* (2013.01); *H04N 21/8456* (2013.01); *H04N 21/8543* (2013.01)

(56) References Cited

U.S. PATENT DOCUMENTS

| | | |
|---|---|---|
| 2002/0083439 A1 | 6/2002 | Eldering |
| 2002/0184047 A1 | 12/2002 | Plotnick et al. |
| 2009/0030802 A1* | 1/2009 | Plotnick et al. ................. 705/14 |

FOREIGN PATENT DOCUMENTS

| | | |
|---|---|---|
| JP | 2001357300 A | 12/2001 |
| JP | 2003242074 A | 8/2003 |
| JP | 2003244671 A | 8/2003 |
| JP | 2004032669 A | 1/2004 |
| WO | WO 99/30493 A | 6/1999 |
| WO | WO 03/024085 A2 | 3/2003 |

OTHER PUBLICATIONS

Office Action, Japan Application No. 2007-052964, mailed Oct. 4, 2011.
Office Action, Japan Application No. 2007-052964, mailed Mar. 12, 2011.
International Preliminary Report on Patentability, PCT Application No. PCT/US2005/007777, mailed on Sep. 21, 2006.
International Search Report, PCT Application No. PCT/US2005/007777, mailed on Apr. 20, 2006.
Office Action, Canada Application No. 2558488, mailed Feb. 28, 2012.
Office Action, Canada Application No. 2558488, mailed Jan. 14, 2014.

* cited by examiner

DIGITAL AD INSERTION FOR VIDEO-ON-DEMAND

PRIORITY CLAIM AND CROSS REFERENCE TO RELATED APPLICATIONS

This application claims priority under 35 U.S.C. 120 and/or 35 U.S.C. 365 as a continuation of the PCT application titled DIGITAL AD INSERTION FOR VIDEO-ON-DEMAND, having application number PCT/US2005/007777, filed on 9 Mar. 2005, now abandoned.

The present application claims priority to the United States provisional patent application entitled ADVERTISING INSERTION AND VIDEO-ON-DEMAND, having application No. 60/552,060, filed on Mar. 9, 2004.

TECHNICAL FIELD

The present disclosure relates to providing advertising in conjunction with the delivery of digital content.

BACKGROUND ART

Video-on-demand (VOD) service enables people to select the content they wish to experience, in their own homes or elsewhere (such as in hotel rooms), often at a time and date of their choosing. Video-on-demand may be offered on a pay-as-you-go basis, subscription basis, or combinations thereof. A person placing an order, e.g. request, for VOD content may be referred to as a subscriber, requestor, client, or purchaser of the content. Certain types of pay-per-view are examples of VOD service. Network personal video recording (nPVR) provides another example.

Broadcast content distribution models often involve the delivery of advertising in conjunction with program content. Often in such models, the advertising to provide with particular programming (a.k.a. asset content or video-on-demand content) is determined manually or in a static fashion that proves inflexible to meet the dynamic, personal nature of VOD service.

U.S. Pat. Nos. 5,659,539, 6,112,226, and 6,578,070 describe methods and systems for delivering digital data. However, none of these references describe inserting digital advertising into digital data.

DISCLOSURE OF INVENTION

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

One aspect of the invention provides a method including identifying one or more ad break points within digital video and/or audio content, selecting ad content to provide with the video and/or audio content, and generating a playlist referencing the ad content at the one or more ad break points.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

References to "one embodiment" or "an embodiment" do not necessarily refer to the same embodiment, although they may.

"Logic" refers to signals and/or information that may be applied to affect the operation of a device. Software, hardware, and firmware are examples of logic. Hardware logic may be embodied in circuits. In general, logic may comprise combinations of software, hardware, and/or firmware.

Figure 1:
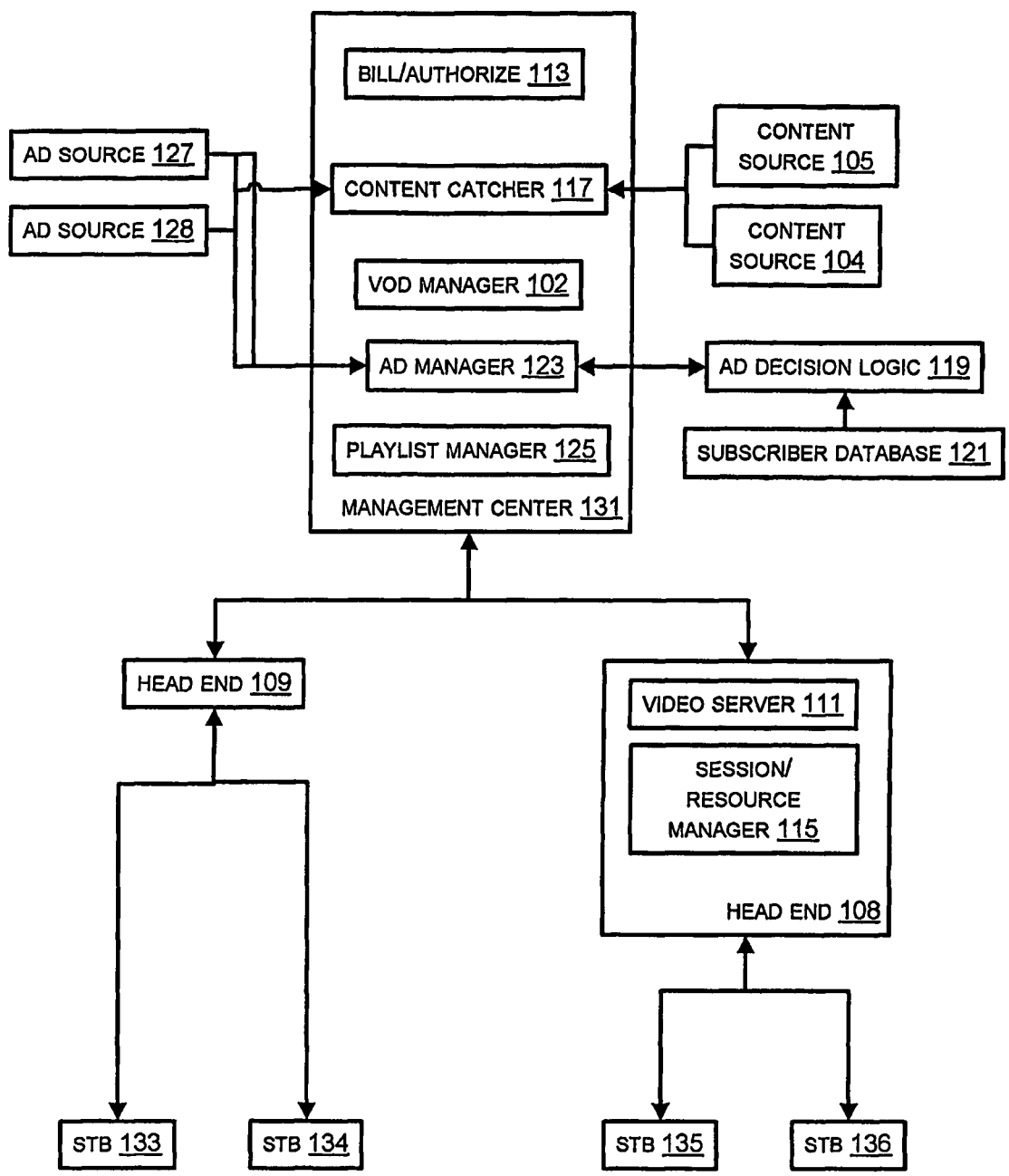
FIG. 1 is a block diagram of an embodiment of a video-on-demand delivery system with ad insertion.

FIG. 1 is a block diagram of an embodiment of a video-on-demand delivery system with ad insertion. A management center 131 may include video-on-demand (VOD) manager logic 102, ad manager logic 123, and playlist manager logic 125. The management center may also include, inter alia, "content catcher" logic 117 and subscriber and advertiser billing and authorization logic 113.

The management center 131 may operate to receive ad schedules, ad content, and "asset" content, e.g. VOD content.

Ad content and asset content may be embodied in digital audio/video files. Digital audio/video file format examples include, Moving Picture Experts Group (MPEG, or officially ISO/IEC JTC1/SC29 WG11) encoded files, for example MPEG-2 encoded files. MPEG-2 is a commonly used technique for over the air and cable plant distribution of video and audio information, among other things.

Ad content and related information (ad "metadata") may be received from ad sources 127, 128. The ad sources 127, 128 may include paid advertisers that wish to include advertising content among the video/audio information distributed by the management center to the distribution centers 108, 109. The video/audio distribution centers 108, 109 are commonly referred to as "head ends". Advertising content may come in the form of MPEG-2 video/audio files of various durations, including files that when played have durations of 15 seconds, 30 seconds, or 60 seconds. Such ad content is commonly referred to as "commercials".

The head ends 108, 109 may each comprise, inter alia, one or more video servers 111 and session/resource manager logic 115. The video server logic 111 operates to distribute video/audio information, e.g. asset and ad content, to set top boxes 135, 136 associated with the head end 108. Set top boxes 135, 136 may be found, among other places, at client (e.g. VOD subscriber) premises.

The session/resource manager logic 115 may interact with the set top boxes 135, 136 to receive orders (e.g. requests) for video-on-demand content. The session/resource manager 115 may act to allocate head-end resources to fulfill VOD orders. The session/resource manager 115 may interact with the management center 131 and the billing/authorization logic 113 to authorize the fulfillment of a content request and to bill the requesting subscriber's account. The session/resource manager 115 may also interact with the billing/authorization logic 113 to provide for the tracking of delivery of advertisements and accounting therefor.

The management center 131 may receive asset content from asset content sources 104, 105. Asset content comprises playable content and related information such as content metadata, asset metadata, or video-on-demand content metadata.

The content catcher logic 117 may operate to receive the ad content, asset content, ad metadata, and content metadata. Ad schedules to apply to the ad content may be provided by the ad sources 127, 128 to the ad manager 123. The ad manager logic 123 and the VOD manager logic 102 may then operate to distribute the ad content and asset content to the various head ends 108, 109 according, at least in part, to program schedules for the asset content and ad schedules for the ad content.

The playlist manager 125 may generate playlists that are provided to the head ends 108, 109 in order to instruct the delivery of asset and ad content to the set top boxes 133-136.

Generation of playlists by the playlist manager 125 may be guided by the ad manager 123, which interacts with ad decision logic 119 to determine appropriate advertising to associate with the delivery of particular asset content, according to various possible factors. Some factors that may influence the selection of ad content include information about the person or persons that will experience the associated asset content, e.g. subscriber information. Subscriber information may be kept in a subscriber database 121.

The ad decision logic 119 and subscriber database 121 may be co-located with the management center 131, comprised by the management center 131, or separate from it. Much variability is associated with how such ad decisions come to be made. Variability includes fully automated decision making based on one or several kinds of ad related and other information (such as, for example, known subscriber habits). Variability also comprises, in some embodiments, some human decision making. Variability also occurs in where the underlying information is stored, and its location with respect to other elements of the VOD system.

For example, decisions about which advertising to include with asset content may be made at an office with that purpose in Seattle, Wash., while the distribution of asset and ad content may take place across several regional management centers 131 elsewhere in the country.

In a second example, fully automated decisions about advertising placement within VOD content may be made by ad decision logic 119 within a management center 131.

Figure 2:
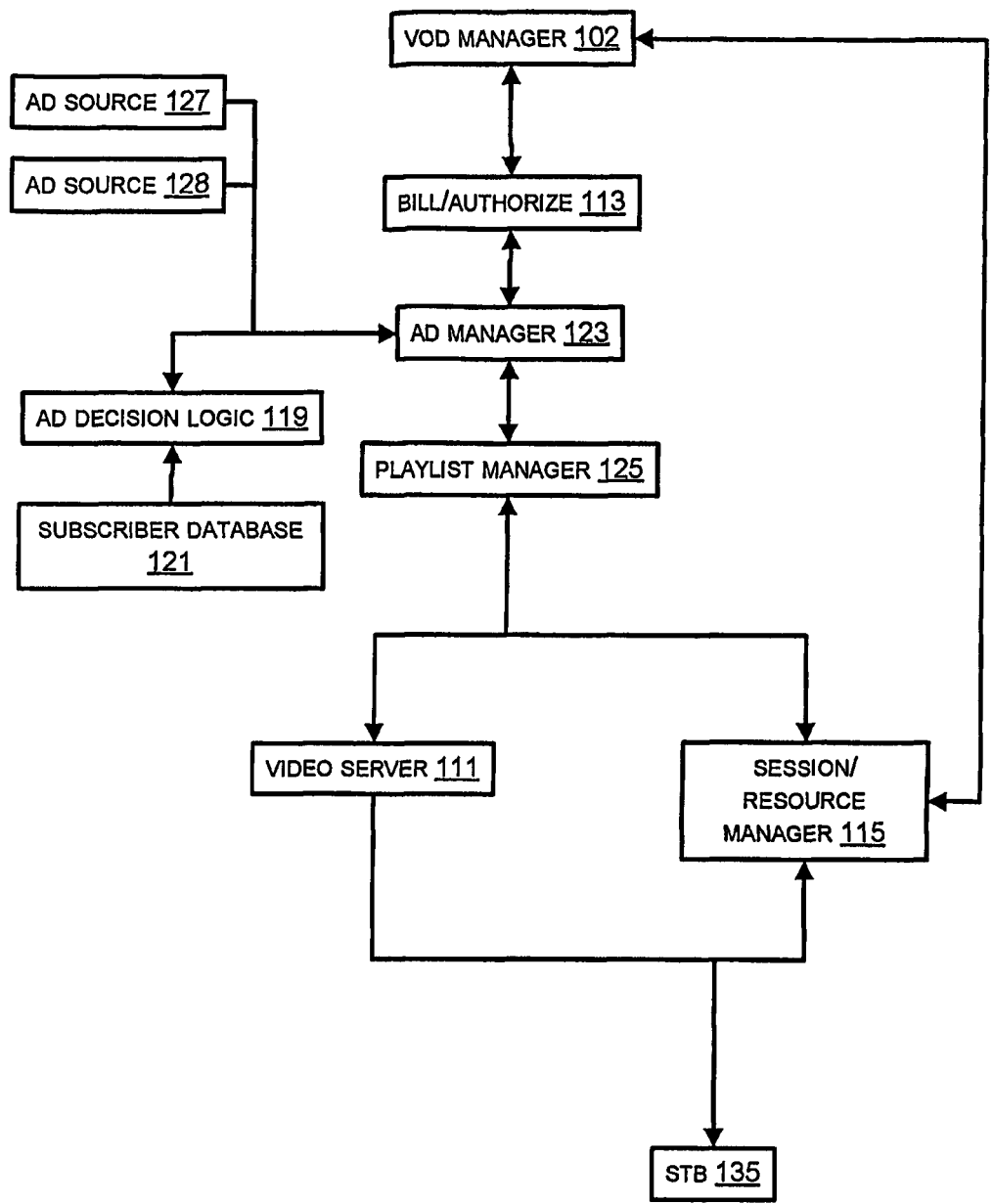
FIG. 2 is a block diagram of an embodiment of ad insertion elements of a video-on-demand delivery system.

FIG. 2 is a block diagram of an embodiment of ad insertion elements of a video-on-demand delivery system. The elements shown are the VOD manager 102, the bill/authorize logic 113, the ad manager 123, the playlist manager 125, the ad sources 127 128, the ad decision logic 119, the subscriber database 121, the video server 111, the session/resource manager 115, and the set top box 135.

The session/resource manager logic 115 may interact with the set top box 135 to receive requests for video-on-demand content. The requested VOD content may be identified by a content identifier. A content identifier is a video asset id, for example an id assigned to a metadata asset id field as defined by CableLabs® VOD and metadata standards. The set top box 135 may provide the content identifier during establishment of a video-on-demand session.

Advertising break points may be identified for the digital video and/or audio VOD content identified by the content identifier. The advertising break points may be identified using information contained within the VOD content metadata.

Metadata Is information about the content. Metadata may comprise, inter alia, the content title, asset id (e.g. content Identifier), content provider, the date when the content should be made available to subscribers via set top box menus, the date when the content should no longer be available, the content category (e.g. romance, comedy, horror, etc.), a description of the content, the content rating (e.g. PG, R, PG-13), the actors that appear in or contribute to the content, the price of ordering the content, DVD cover graphics. Ad break point metadata may include, inter alia, information about at least one of a starting point for an ad break, a stopping point for an ad break, a duration of an ad break, a type of an ad break, or an owner of an ad break.

Advertising break points may be identified within the digital video and/or audio VOD content itself. Such "embedded" ad break points may be characterized by one or more special digital sequences. For example, locations within a digital MPEG-2 file or stream may comprise SCTE-35 cue packets. For analog content, ad breaks may be encoded cue tones identifying splice points for ad insertion into the digital stream.

Advertising content may be selected to provide with the video and/or audio VOD content. Ad decision logic 119 may be used, at least in part, to select advertising content. The selection process may comprise, inter alia, examination of at least one of ad schedules, geographic region to which the content is to be delivered, subscriber profile information, content metadata, or ad metadata.

Ad content may be selected subsequent to receiving a request for the VOD content from a set top box 135, or prior to a VOD request where subscriber, geographic region, time/date, and/or household information are less important factors in selecting the ad content.

Selecting ad content to provide with the VOD content may include selecting ad content at least in part according to one or more ad schedules. Ad schedules include information about advertising, such as how many times one or more ads should receive exposure, during what times and/or dates, in association with which types of content, and so on. Selecting ad content at least in part according to an ad schedule may include selecting an ad schedule for a region comprising a set top box 135 that provided a request for the VOD content. In other words, ad schedules may be geographically/regionally specific.

Selecting ad content to provide with the VOD content may include selecting ad content at least in part according to a feature or property of a geographic region. The geographic region will, in some embodiments, be associated with a service group identifier provided from a set top box 135.

Selecting ad content to provide with the VOD content may include selecting ad content at least in part according to demographic information about a household or person requesting the VOD content (i.e. subscriber or household profile information, or one or more features or properties of the subscriber or household profile). Subscriber profile information includes, inter alia, information about a subscriber, for example where they live, their profession, income level, marital status, children in the home, age, race, religion, content interests, and shopping habits.

Ad content may be selected at least in part according to a set top box identifier provided by the set top box 135. The set top box identifier may be or include a MAC address for the set top box. The ad content may be selected at least in part according to a household and/or subscriber identifier provided by the set top box 135, or associated with the set top box identifier.

Selecting ad content to provide with the VOD content may include generating a video-on-demand session profile, and selecting ad content suitable to the session profile. The session profile may be generated specifically according to a region, household, service group, or other information specific to the set top box making the request, as well as time/date information, the nature of the requested content, and so on.

Selecting ad content to provide with the VOD content may include selecting ad content at least in part according to VOD content metadata and/or ad metadata. The VOD content metadata may be identified at least in part using the content identifier. VOD content metadata such as the provider of the VOD content, a category to which the VOD content belongs, a rating associated with the VOD content, or the typical interests or purchasing characteristics of other watchers of the VOD content may be used in selecting ad content.

Selecting advertising to provide with content corresponding to the content identifier may include selecting advertising at least in part according to at least one of a date or time of day that the content identifier is received, e.g. a time/date of the request and/or establishment of the VOD session.

The playlist manager 125 comprises logic to generate a playlist. A playlist is a file and/or memory region comprising identifiers of one or more video and/or audio files or streams. The playlist identifies a sequence with which to provide content referenced therein. The playlist may for particular content identify a starting point within a content file or stream, a stopping point within the file or stream, and/or a duration or interval over which to provide the content.

For the VOD content request which was sent from the set top box 135, the playlist manager 125 generates a playlist which comprises identification of the video-on-demand content and when the VOD content is to be provided. The playlist also comprises identification of the selected advertising content and when the selected advertising content is to be provided.

Logic to generate a playlist may include logic to generate playlist references that result in the replacement of advertising content embedded in the VOD content. Embedded (in the VOD content) advertising is ad content that is part of the file comprising the video and/or audio information which was selected by the subscriber for playing. (Typically the subscriber has not deliberately selected the ads; the ads happen to be in the digital file along with the deliberately selected content.) Ad replacement occurs when the content is provided to a subscriber and the embedded ad content is replaced with different ad content. In some cases, the ad decision logic 119 may determine that some of the embedded ads should be replaced, and others retained.

Logic to generate a playlist may include logic to generate playlist references that result in the insertion of ad content when providing the VOD content. Ad insertions do not replace embedded advertising; they insert ad content at the breaks but do not replace content there. The playlist may define insertion of the ad content at the ad break points. Playlist references comprise, inter alia, at least one of a file identifier, file path, network address, uniform resource locator (URL), or other pointer to the ad content.

A playlist may be generated at a management site and communicated to a content distribution head end. Communicating a playlist to a head end may involve communicating ad content and asset content referenced in the playlist to the head end if the content is not already available to the head end.

The playlist may be communicated to a video server 111, the video server 111 applying the references in the playlist to identify content and selected advertising files/streams to provide to the set top box.

The head end or video server 111 may signal when the ad content is not available. In this situation, the missing ad content may then be provided, or different suitable ad content may be substituted, or the missing ad may be "skipped", i.e., the playlist may be played but without that ad and with no other ad substituted.

The video server 111 may receive from the set top box 135 a signal to pause or stop the providing of the content to the set top box 135. Subsequently, the video server 111 may receive from the set top box 135 a signal to resume providing the content to the set top box 135. In some embodiments, different advertising may be selected and referenced in the playlist upon resuming delivery of the VOD content. The different advertising may be selected at least in part according to changed conditions when the signal to resume is received. This may result in a modified playlist referencing the different advertising.

The video server 111 may receive one or more signals to cause replaying of at least a portion of the content. In some embodiments, the playlist may be modified so that advertising content that has already been provided is not provided again during replay. In some embodiments, different advertisements may be provided for the replay, and/or some ad insertion points may be skipped.

Updating an ad tracking database may occur as a result of providing ad content referenced in the playlist. Thus, the advertiser may be billed for actual ad exposures resulting from VOD service.

Figure 3:
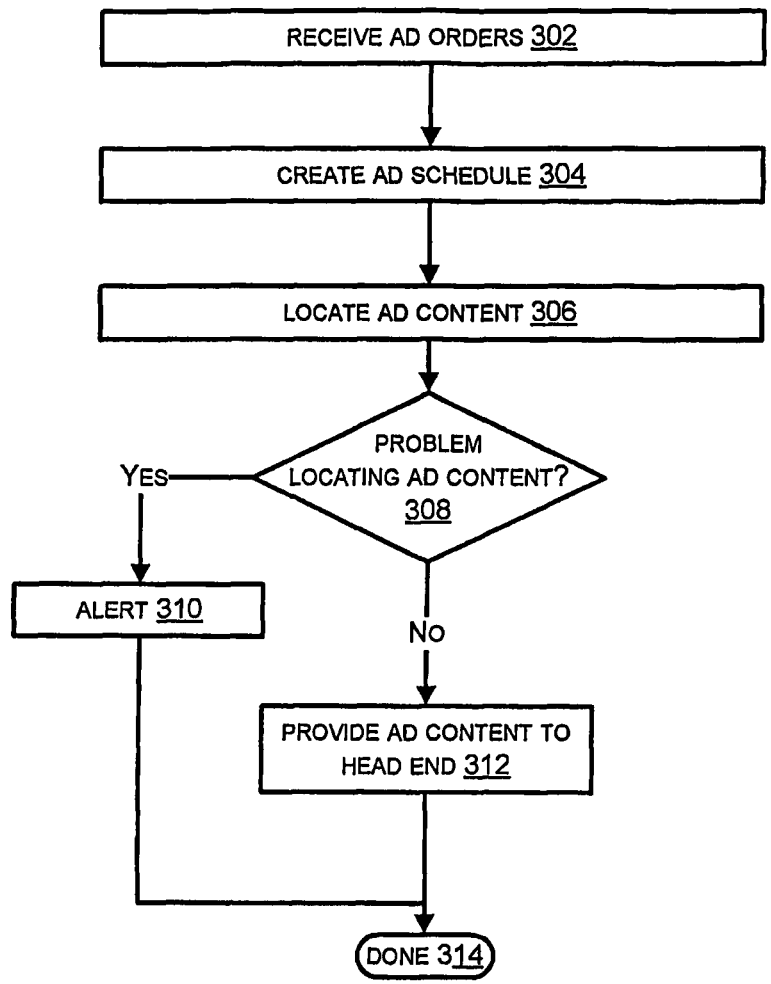
FIG. 3 is a flow chart of an embodiment of receiving and processing ad content.

FIG. 3 is a flow chart of an embodiment of a process of receiving and processing ad content. Ad orders are received at 302, and at 304 the ad orders are processed into ad schedules that may be made available to a management center. Corresponding ad content is located, typically by the management center, at 306 and made available to the appropriate head ends for distribution prior to a time when any associated asset content will be made available for order as video-on-demand.

If at 308 there is a problem locating the ad content referenced by the ad schedules, an alert is raised at 310 and appropriate remedial measures may be initiated. Otherwise at 312 the ad content is provided to the head end for access by the video server at the appropriate time. The process concludes at 314.

Not all implementations will involve ad schedules. In some situations the ad content will be provided with appropriate rules and/or ad metadata, and decisions about which asset content to associate with the ad content will take place dynamically according to those rules, metadata, and other dynamic conditions, in addition to or in place of information from ad schedules. For example, decisions to associate particular ad content with fulfillment of a particular video-on-demand asset request may depend, to name just some of the possibilities, upon such factors as how many exposures of the ad content have already taken place, the time and the date of the asset request, the nature of the asset as indicated by the asset metadata, the geographic region and/or household from which the request originated, features of the subscriber making the asset request, and so on.

Figure 4:
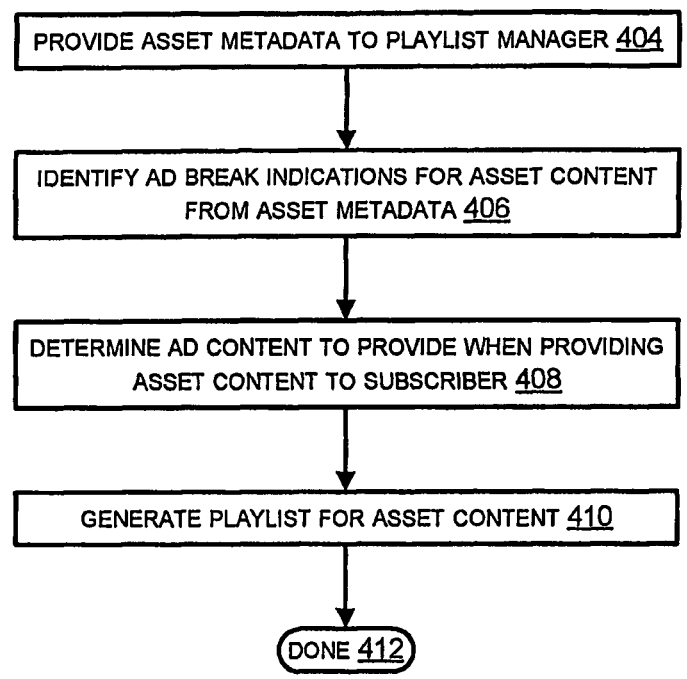
FIG. 4 is a flow chart of an embodiment of generating a playlist for a content title.

FIG. 4 is a flow chart of an embodiment of generating a playlist for a content title. At 404 the asset metadata is provided to the playlist manager. Ad break indications in the content metadata are identified at 406. At 408 ad content to provide at these ad breaks is determined. At 410 a playlist Is generated, referencing the asset content, and referencing the ad content at the ad breaks.

Figure 5:
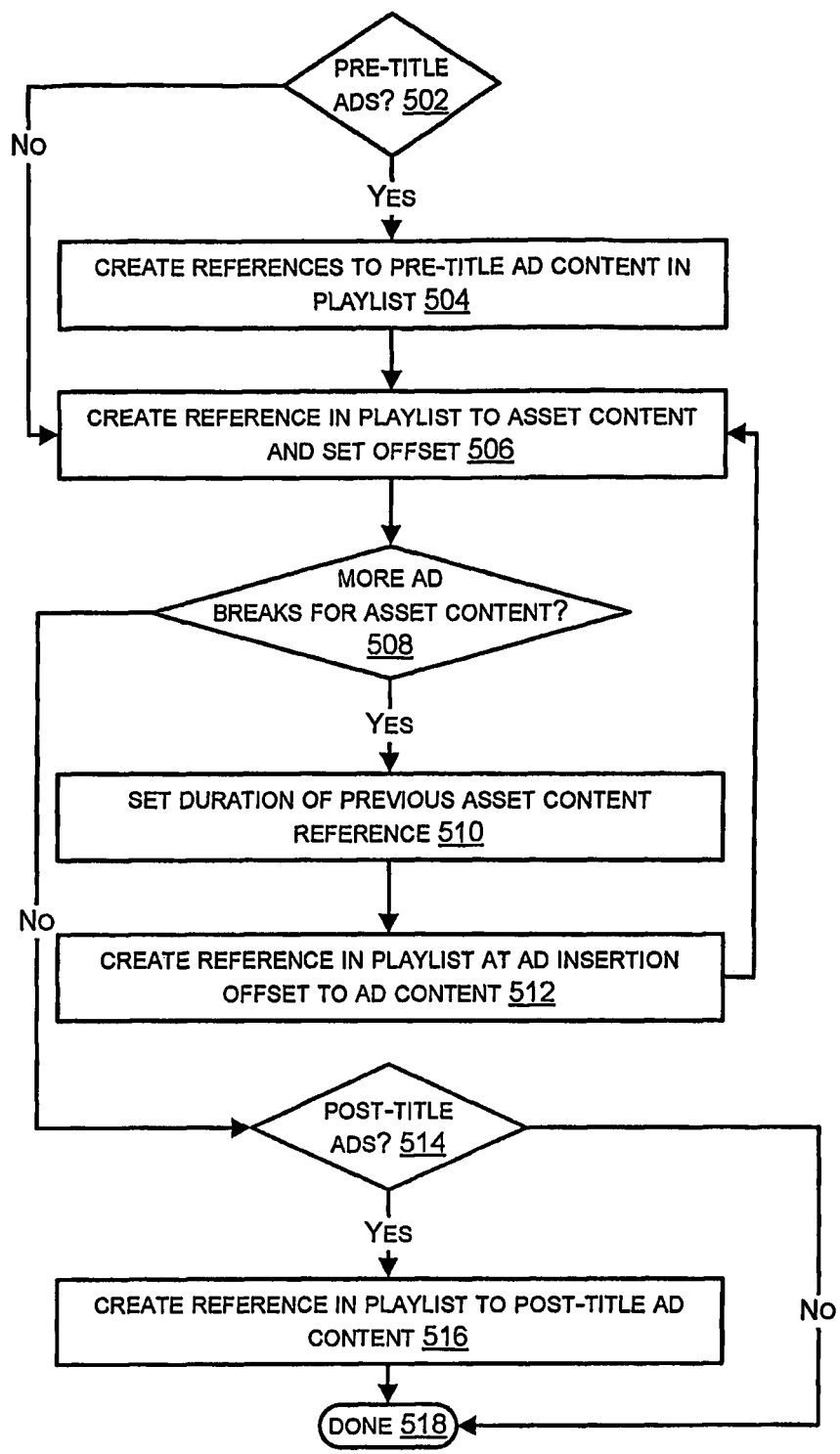
FIG. 5 is a flow chart of an embodiment of generating a playlist for a title to provide for advertising breaks.

FIG. 5 is a flow chart of an embodiment of generating a playlist for a title to provide for advertising breaks. Advertising may be provided before, during, and after delivery of asset content. Advertising provided before delivery of asset content may be referred to as pre-title advertising. Advertising provided after delivery of asset content may be referred to as post-title advertising. Advertising provided during delivery of asset content utilized ad breaks.

If at 502 there are pre-title ads, one or more references are created in the playlist to the pre-title ad content at 504. At 506 one or more references are created in the playlist to the asset content, with the appropriate offset(s). The offset may be zero, indicating that the asset content should be provided from the beginning. In situations where the asset content is provided via multiple digital files, the file comprising the beginning of the asset content may be referenced first in the playlist.

At 508 it is determined whether there are ad breaks yet to provide for associated with the delivery of the asset content. If so, the duration of a previous asset content reference may be set or adjusted to account for the ad break. For example, if an ad break occurs fifteen minutes after the beginning of the asset content, the duration of the first reference to the asset content in the playlist may be adjusted to fifteen minutes. Thus, the first reference to the asset content may Indicate that the asset content should be presented from the beginning (e.g. offset 0) for a duration of fifteen minutes. At 512 one or more references are created in the playlist to the ad content to insert at the encountered advertising break.

The next reference to the asset content that is created in the playlist may indicate that the asset content should be delivered from the point at which it was interrupted to provide for the ad break. Thus, where the first ad break occurred fifteen minutes after the beginning of the asset content, the next reference to the asset content in the playlist may indicate that the asset content should be provided resuming fifteen minutes from the beginning of the asset content. In this manner, ad insertion is provided for asset content that does not contain embedded advertising.

If, on the other hand, there is embedded advertising at the advertising break, the next reference to the asset content may indicate that the asset content should be delivered from a point at which it was interrupted, plus an additional time later to account for the duration of the ad that was provided at the break. In this manner, replacement of embedded advertising content is provided.

At 514, when there are no more ad breaks to provide for, it is determined whether there are any post-title ads associated with delivery of the asset content. If so, one or more references are created in the playlist to the post-title ad content. The process concludes at 518.

Figure 6:
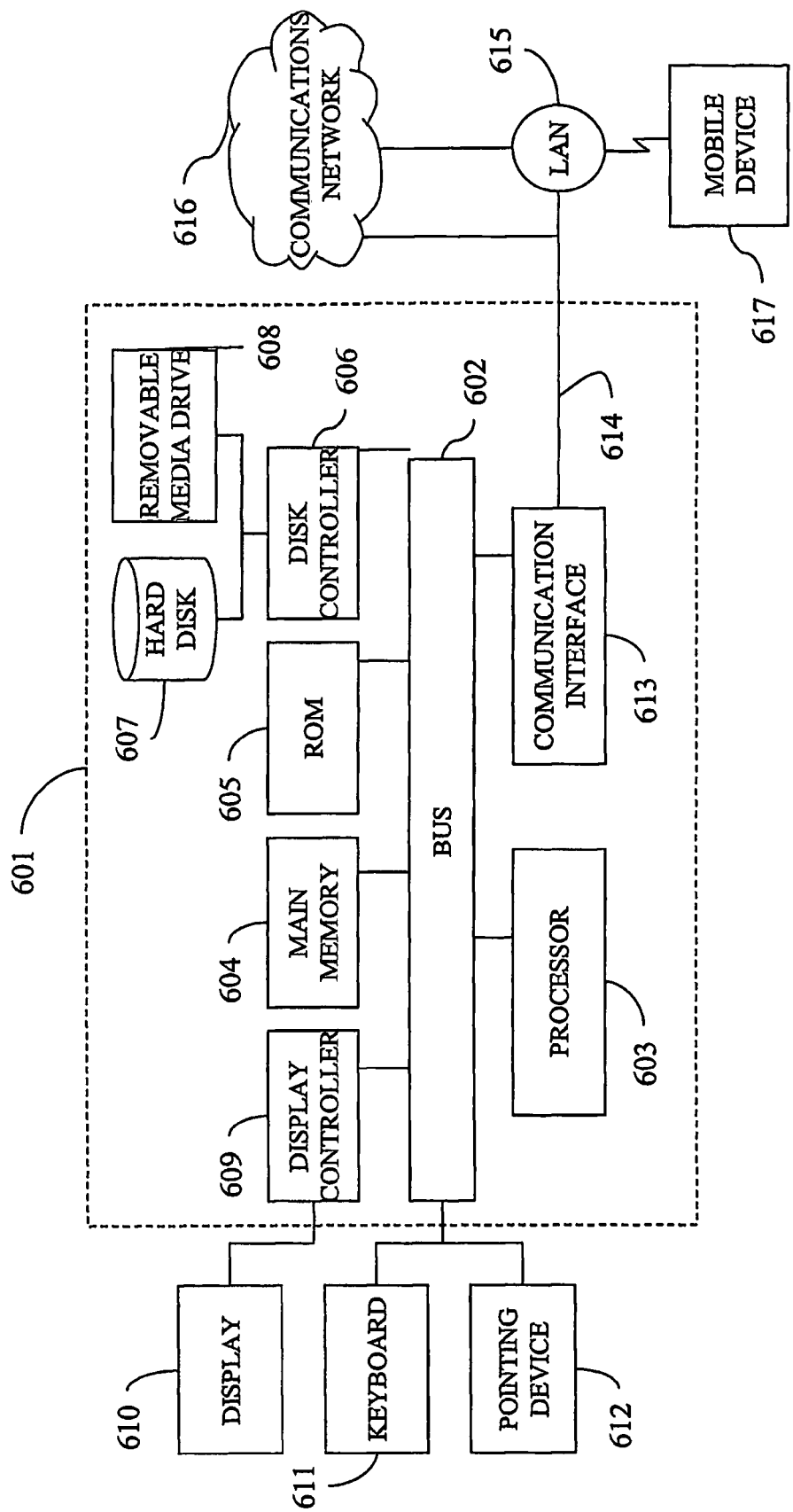
FIG. 6 illustrates a computer system upon which an embodiment of the present invention may be implemented.

FIG. 6 illustrates a computer system 601 upon which an embodiment of the present invention may be implemented. The computer system 601 includes a bus 602 or other communication mechanism for communicating information, and a processor 603 coupled with the bus 602 for processing the information. The computer system 601 also includes a main memory 604, such as a random access memory (RAM) or other dynamic storage device (e.g., dynamic RAM (DRAM), static RAM (SRAM), and synchronous DRAM (SDRAM)), coupled to the bus 602 for storing information and instructions to be executed by processor 603. In addition, the main memory 604 may be used for storing temporary variables or other intermediate information during the execution of instructions by the processor 603. The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, such as a cathode ray tube (CRT), for displaying information to a computer user. The computer system includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the invention in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 601, for driving a device or devices for implementing the invention, and for enabling the computer system 601 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 603 for execution. A computer readable medium may take many forms, including but not limited to, non-volatile media, volatile media, and transmission media. Non-volatile media includes, for example, optical, magnetic disks, and magneto-optical disks, such as the hard disk 607 or the removable media drive 608. Volatile media includes dynamic memory, such as the main memory 604. Transmission media includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 601 may receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a network interface card to attach to any packet switched LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively.

Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A video-on-demand service provider comprising machine memory and circuits, the machine memory and circuits themselves comprising:

logic configured to select advertising to provide with video-on-demand content, the advertising to provide selected at least in part according to at least one of content metadata, ad schedules, or subscriber profile information, and to signal when the advertising to provide is unavailable;

logic configured to identify ad break points for the video-on-demand content;

logic configured to generate a playlist identifying the video-on-demand content and when the video-on-demand content is to be provided, and identifying content corresponding to selected advertising and when the content corresponding to selected advertising is to be provided;

logic to receive from a set top box a signal to pause or stop providing of the content to the set top box;

logic to receive from the set top box a signal to resume providing the content to the set top box; and logic to select different advertising from the advertising to provide at least in part according to changed conditions when the signal to resume providing the content to the set top box is received, and to modify the playlist to reference the different advertising.

2. The video-on-demand service provider of claim 1, wherein the logic configured to generate the playlist further comprises:

logic configured to generate playlist references that result in replacement of advertising content embedded in the video-on-demand content.

3. The video-on-demand service provider of claim 1, wherein the logic configured to generate the playlist further comprises:
   logic configured to generate playlist references that result in insertion of ad content when providing the video-on-demand content.

4. The video-on-demand service provider of claim 1, wherein the logic configured to select the advertising to provide with the video-on-demand content further comprises:
   logic configured to select the advertising to provide according to an ad schedule for a region comprising the set top box that provided a request for the video-on-demand content.

5. A method comprising:
   receiving a content identifier from a set top box;
   selecting advertising to provide with content corresponding to the content identifier, the advertising to provide selected, at least in part, according to at least one of a feature or property of the content corresponding to the content identifier, a feature or property of a household or subscriber requesting the content, or a feature or property of a geographic region comprising the set top box from which a request for the content corresponding to the content identifier is received;
   generating a playlist referencing the content corresponding to the content identifier and the advertising to provide, and signaling when the advertising to provide is unavailable;
   providing the playlist to a video server, the video server applying references in the playlist to identify the content corresponding to the content identifier and the advertising to provide to the set top box;
   receiving from the set top box a signal to pause or stop providing of the content to the set top box;
   receiving from the set top box a signal to resume providing the content to the set top box; and
   selecting different advertising from the advertising to provide at least in part according to changed conditions when the signal to resume providing the content to the set top box is received, and modifying the playlist to reference the different advertising.

6. The method of claim 5, wherein selecting the advertising to provide with the content corresponding to the content identifier further comprises:
   selecting the advertising to provide at least in part according to at least one of a date or time of day that the content identifier is received.

7. The method of claim 5, wherein selecting the advertising to provide with the content corresponding to the content identifier further comprises:
   selecting the advertising to provide at least in part according to at least one of a set top box identifier, a household or subscriber identifier, or a set top box service group.

8. The method of claim 7, wherein selecting the the advertising to provide at least in part according to at least one of the set top box identifier, the household or subscriber identifier, or the set top box service group further comprises:
   selecting the advertising to provide at least in part according to a MAC address of the set top box.

9. The method of claim 5, wherein selecting the advertising to provide with the content corresponding to the content identifier further comprises:
   selecting the advertising to provide at least in part according to at least one of a rating, provider, or category of the content corresponding to the content identifier.

10. The method of claim 5, further comprising:
    receiving one or more signals to cause replaying of at least a portion of the content; and
    modifying the playlist so that advertising content that has already been provided is not provided again.

11. The method of claim 5, further comprising:
    updating an ad tracking database as a result of providing ad content referenced in the playlist.

* * * * *